United States Patent [19]
Sawahashi et al.

[11] Patent Number: 5,566,165
[45] Date of Patent: Oct. 15, 1996

[54] TRANSMISSION POWER CONTROL METHOD AND A COMMUNICATION SYSTEM USING THE SAME

[75] Inventors: Mamoru Sawahashi, Yokosuka; Narumi Umeda, Yokohama; Tomohiro Dohi, Yokohama; Koji Ohno, Yokohama, all of Japan

[73] Assignee: NTT Mobile Communications Network Inc., Tokyo, Japan

[21] Appl. No.: 439,302

[22] Filed: May 11, 1995

[30] Foreign Application Priority Data

May 12, 1994 [JP] Japan ................................. 6-098816
Apr. 3, 1995 [JP] Japan ................................. 7-077937

[51] Int. Cl.$^6$ ................................................. H04J 13/00
[52] U.S. Cl. ................................................. 370/18; 455/38.3
[58] Field of Search .......................... 370/18, 95.1, 95.3; 455/13.4, 33.1, 33.2, 38.1, 38.3, 52.1, 52.2, 52.3, 53.1, 54.1, 68, 343; 379/59, 60; 375/200, 202, 205

[56] References Cited

U.S. PATENT DOCUMENTS

| | | | |
|---|---|---|---|
| 5,204,970 | 4/1993 | Stengel et al. | 455/69 |
| 5,386,589 | 1/1995 | Kanai | 455/33.1 |
| 5,446,756 | 8/1995 | Millinckrodt | 375/200 |
| 5,469,115 | 11/1995 | Peterzell et al. | 455/240.1 |
| 5,469,471 | 11/1995 | Wheatley, III | 375/205 |
| 5,485,486 | 1/1996 | Gilhousen et al. | 375/205 |

FOREIGN PATENT DOCUMENTS 0428099  5/2291  European Pat. Off. .
WO-A-92
21196  11/1992  WIPO .

*Primary Examiner*—Douglas W. Olms
*Assistant Examiner*—Ajit Patel
*Attorney, Agent, or Firm*—Rogers & Wells

[57] ABSTRACT

A transmission power control method for a CDMA system including the steps of calculating an actual SIR (Signal-to-Interference Ratio) of a desired signal; deciding whether the actual SIR is greater than a predetermined reference SIR which satisfies a predetermined conununication quality; forming a transmission power control bit on the basis of a result of deciding; inserting the transmission power control bit periodically into a forward frame, which steps are performed at the base station, and steps of calculating tentative reverse transmission power in accordance with the transmission power control bit in the forward frame; deciding reverse transmission power such that the reverse transmission power is made equal to the tentative reverse transmission power when the tentative reverse transmission power is less than a predetermined maximum transmission power, but otherwise made equal to the predetermined maximum transmission power; and transmitting a signal from the mobile station to the base station at the reverse transmission power, which steps are performed at the mobile station. This makes it possible to prevent the transmission power from diverging to the maximum output of a transmitter power amplifier.

10 Claims, 13 Drawing Sheets

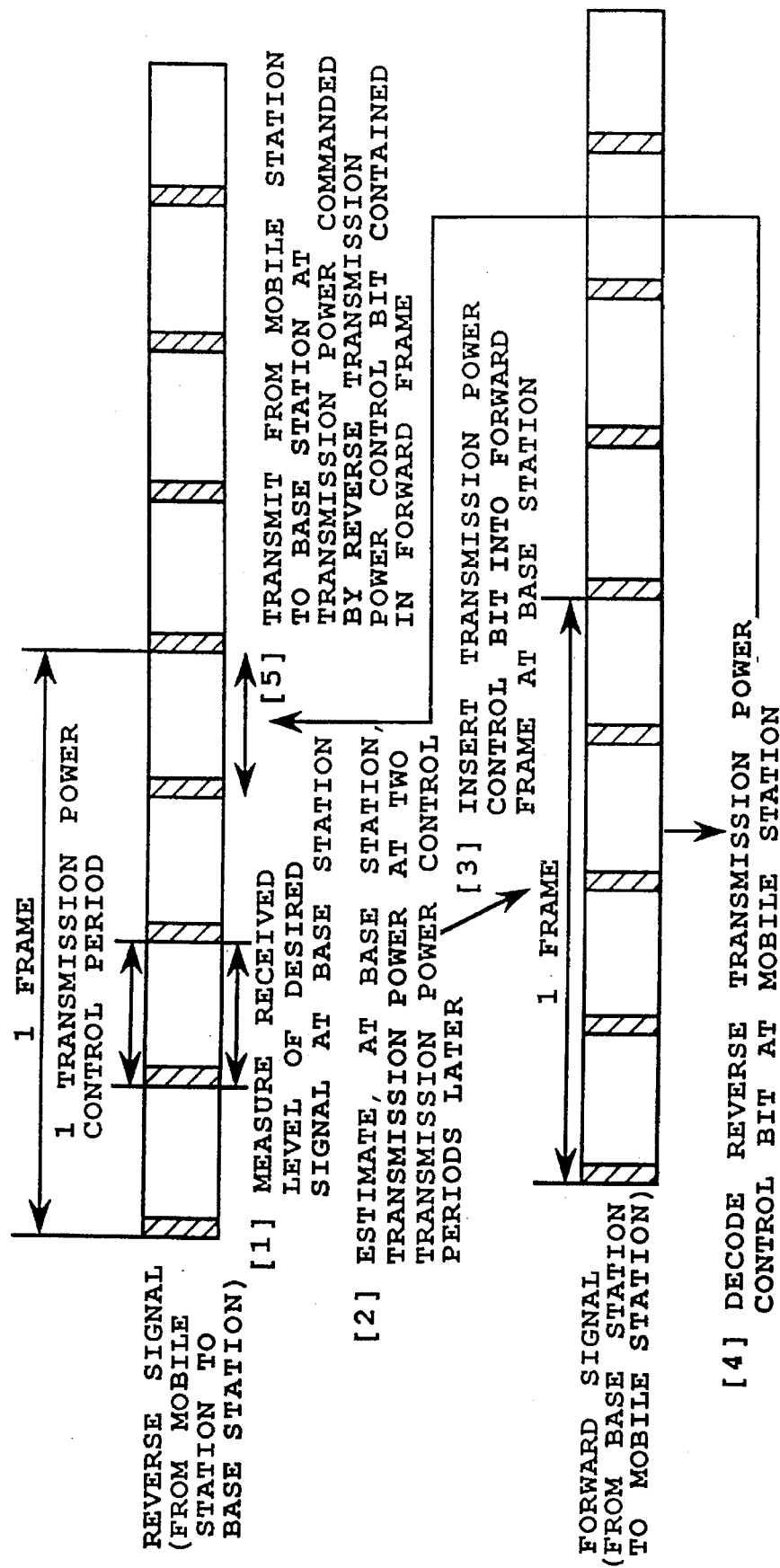

TRANSMISSION POWER CONTROL METHOD AND A COMMUNICATION SYSTEM USING THE SAME

BACKGROUND OF THE INVENTION

1. Field of the Invention

The present invention relates to a transmission power control method and a communication system using the same, and more particularly to a transmission power control method in a CDMA (Code Division Multiple Access) system which performs multiple access using a spread spectrum technique in mobile communications, and a communication system using this method.

2. Description of Related Art

As is well-known, a CDMA system falls into two classes: a direct sequence (DS) system which spreads a conventionally modulated signal by using a high rate spreading code; and a frequency hopping (FH) system which resolves a symbol into elements called chips, and translates each chip into signals of different center frequencies at a high rate. Since the FH system is difficult to implement in the state of the art, the DS system is usually employed. Spread-spectrum radio systems differ from conventional communication systems for satellite data networks such as SCPC/FDMA (Single Channel Per Carrier/Frequency Division Multiple Access) systems, or TDMA (Time Division Multiple Access) systems in that the spread-spectrum radio systems transmit, at a transmitter side, a signal which is modulated by a common modulation, and then by a secondary modulation using a spreading code, which widens its signal bandwidth. At a receiver side, on the other hand, the wideband received signal is despread to restore the narrow band signal, followed by a conventional demodulation processing. The despreading is performed by detecting correlation between the spread-spectrum sequence of the received signal and a spreading code sequence which is generated at the receiving station, and peculiar to the channel. The capacity in terms of the number of subscribers in a cell is determined by an SIR (Signal-to-Interference Ratio) needed to achieve a required error rate because a CDMA system uses the same frequency band for the subscribers.

Applying the CDMA system to a mobile communication presents a problem in that received signal levels at a base station from respective mobile stations vary significantly depending on the locations of the mobile stations, and this arises a "near-far problem", in which a large power signal masks a small power signal, thereby reducing the number of mobile stations communicatable at the same time. In other words, a communication quality of a channel is degraded by signals of other communicators because the same frequency band is shared by a plurality of communicators and the signals from the other communicators become an interference.

FIG. 1 illustrates an interference state in a reverse (from mobile station to base station) channel due to other mobile stations. The reference characters BS1–BS3 designate base stations, and MS1–MS3 designate mobile stations in the cell associated with the base station BS1. When the mobile station MS1 closer to the base station BS1 than the mobile station MS2 communicates with the base station BS1 at the same time with the mobile station MS2, the received power of the base station BS1 from the near mobile station MS1 will be greater than that from the faraway mobile station MS2. As a result, the communications between the faraway mobile station MS2 and the base station BS1 will be degraded owing to the interference from the near mobile station MS1.

To overcome this near-far problem, a transmission power control has been introduced. The transmission power control regulates received power at a receiving station, or the SIR determined by the received power, such that the received power or the SIR becomes constant regardless of the locations of mobile stations, thereby achieving uniform communication quality in a service area.

FIG. 2 shows a received power level at a base station when the transmission power control in a reverse direction is carried out, in comparison with a received power level when the power control is not carried out. Since a mobile station near the border to an adjacent cell receives interference from the adjacent cell, the degradation of communication quality due to the near-far problem occurs in both reverse and forward (from base station to mobile station) communications.

FIG. 3 illustrates an interference state of a forward channel from the base station BS1 to the mobile station MS3, due to the base stations BS2 and BS3 of other cells. As shown in this figure, signal powers of the other communicators become interference, and hence, transmission power control must be carried out to prevent the signal powers of the other communicators from growing much larger than the transmission power of the intended channel.

In particular, with regard to a reverse channel, each mobile station controls transmission power such that the received power thereof at the base station becomes constant. Since the interference is considered as white noise in the CDMA system, an error in the transmission power is the most important factor in determining the capacity in terms of the number of subscribers in a cell. For example, an error of 1 dB in the transmission power will reduce the capacity in terms of the number of the subscribers by about 30%.

On the other hand, with regard to a forward channel, since the signal of an intended channel and interferences caused by signals for other users within the cell propagate through the same path, they are subject to the same long interval fluctuations, the same short interval fluctuations, and the same instantaneous fluctuations, so that their SIR is kept constant. Therefore, the transmission power control is not necessary if the interference is caused only within a cell. Actually, however, interferences from other cells must be considered. This is because although the interference power from other cells undergoes instantaneous fluctuations due to Rayleigh fading as the interference power within the cell, its fluctuations differ from those of the intended signal.

FIG. 4 illustrates behavior of a received signal at a mobile station. In a CDMA system standardized by TIA of the United States, the transmission power control is not basically performed in a forward channel. Instead, a base station detects a frame error rate of a received signal, and increases the transmission power to a mobile station if the frame error rate exceeds a predetermined value. This is because a large increase in the transmission power will increase the interference to other cells. The transmission powers from base stations of other cells constitute an interference which fluctuates instantaneously.

FIG. 5 shows the operation principle of a first conventional closed loop transmission power control which is performed in accordance with a received SIR. In FIG. 5 (and FIG. 6), the reference character S designates the received power of a desired signal, I designates the received power of interferences, and pg designates a processing gain. The first conventional transmission power control in a CDMA system is performed such that an actual SIR agrees with a reference SIR which is determined in advance to provide a required communication quality. Here, the SIR is defined as the ratio of the received power of an intended signal to the interference power which is the sum total of thermal noise and interferences from users other than the intended user. In this first conventional method, an increase in the received signal power of the user to obtain the reference SIR will results in an increase in interference power to other users. This will form a vicious cycle which causes successive increases in transmission powers of respective mobile stations, and each of the mobile stations will come to transmit at its maximum transmission power.

FIG. 6 illustrates the operation principle of a second conventional closed loop transmission power control based on a received thermal noise level. The second transmission power control is performed in accordance with a ratio $S/(I_{max}+N)$, where S is the received signal level of an intended wave, $I_{max}$ is the maximum interference power caused by the maximum number of users that the system can accommodate, and N is the thermal noise power. In other words, the transmission power control is performed in accordance with the ratio of the level S to the level $I_{max}$, which levels are measured from the thermal noise level N. In this case, even if the number of actual communicators within the cell is less than the maximum number, a mobile station will radiate such transmission power that ensures a required reception quality at the base station on the assumption that the maximum number of users are communicating at the same-time (SNR in FIG. 6 will be described later).

As a result, in either Case of FIGS. 5 and 6, a mobile station comes to radiate the maximum transmission power corresponding to the maximum capacity in terms of the number of users. This forces the mobile station to consume extra power. A similar problem will occur in a forward channel transmission from base station to mobile stations.

SUMMARY OF THE INVENTION

Therefore, an object of the present invention to provide a transmission power control method and a communication system using the same which can prevent the transmission power from being increased to the maximum output power of a transmitter amplifier by controlling the transmission power in accordance with the ratio of the received signal level of a desired wave to the power from other communicators.

In a first aspect of the present invention, there is provided a transmission power control method for a CDMA (Code Division Multiple Access) system comprising the steps of:

calculating, at a base station, a first actual SIR (Signal-to-Interference Ratio), the first actual SIR being defined as a ratio of received power of a desired signal sent from a mobile station with which the base station is communicating to a sum of interference power and thermal noise power from other stations;

deciding, at the base station, whether the first actual SIR is greater than a first predetermined reference SIR which satisfies a predetermined communication quality;

forming, at the base station, one or more first transmission power control bits on the basis of a result of the step of deciding;

inserting, at the base station, the first transmission power control bits periodically into a forward (from base station to mobile station) frame;

calculating, at the mobile station, tentative reverse (mobile station to base station) transmission power in accordance with the first transmission power control bits in the forward frame sent from the base station;

deciding, at the mobile station, reverse transmission power, the reverse transmission power being made equal to the tentative reverse transmission power when the tentative reverse transmission power is equal to or less than first predetermined maximum transmission power, and being made equal to the first predetermined maximum transmission power when the tentative reverse transmission power is greater than the first predetermined maximum transmission power; and transmitting a signal from the mobile station to the base station at the reverse transmission power.

Here, the first predetermined maximum transmission power may be determined on the basis of a maximum capacity in terms of number of subscribers in a cell, a radius of the cell, and an outage probability of the cell.

In a second aspect of the present invention, there is provided a transmission power control method for a CDMA (Code Division Multiple Access) system comprising the steps of:

calculating, at a mobile station, an actual SIR (Signal-to-Interference Ratio), the actual SIR being defined as a ratio of received power of a desired signal sent from a base station with which the mobile station is communicating to a sum of interference power and thermal noise power from other stations;

deciding, at the mobile station, whether the actual SIR is greater than a predetermined reference SIR which satisfies a predetermined communication quality;

forming, at the mobile station, one or more transmission power control bits on the basis of a result of the step of deciding;

inserting, at the mobile station, the transmission power control bits periodically into a reverse (from mobile station to base station) frame;

calculating, at the base station, tentative forward (base station to mobile station) transmission power in accordance with the transmission power control bits in the reverse frame sent from the mobile station;

deciding, at the base station, forward transmission power, the forward transmission power being made equal to the tentative forward transmission power when the tentative forward transmission power is equal to or less than a predetermined maximum transmission power, and being made equal to the predetermined maximum transmission power when the tentative forward transmission power is greater than the predetermined maximum transmission power; and transmitting a signals from the base station to the mobile station at the forward transmission power.

Here, the predetermined maximum transmission power may be determined on the basis of a maximum capacity in terms of number of subscribers in a cell, a radius of the cell, and an outage probability of the cell.

The transmission power control method may further comprise the steps of:

calculating, at the mobile station, a second actual SIR (Signal-to-Interference Ratio), the second actual SIR being defined as a ratio of received power of a desired signal sent from the base station with which the mobile station is communicating to a sum of interference power and thermal noise power from other stations;

deciding, at the mobile station, whether the second actual SIR is greater than a second predetermined reference SIR which satisfies a predetermined communication quality;

forming, at the mobile station, one or more second transmission power control bits on the basis of a result of the step of deciding;

inserting, at the mobile station, the second transmission power control bits periodically into a reverse (from mobile station to base station) frame;

calculating, at the base station, tentative forward (base station to mobile station) transmission power in accordance with the second transmission power control bits in the reverse frame sent from the mobile station;

deciding, at the base station, forward transmission power, the forward transmission power being made equal to the tentative forward transmission power when the tentative forward transmission power is equal to or less than second predetermined maximum transmission power, and being made equal to the second predetermined maximum transmission power when the tentative forward transmission power is greater than the second predetermined maximum transmission power; and transmitting a signal from the base station to the mobile station at the forward transmission power.

In a third aspect of the present invention, there is provided a transmission power control apparatus for a CDMA (Code Division Multiple Access) system comprising:

means for calculating, at a base station, a first actual SIR (Signal-to-Interference Ratio), the first actual SIR being defined as a ratio of received power of a desired signal sent from a mobile station with which the base station is communicating to a sum of interference power and thermal noise power from other stations;

means for deciding at the base station, whether the first actual SIR is greater than a first predetermined reference SIR which satisfies a predetermined communication quality;

means for forming, at the base station, one or more first transmission power control bits on the basis of a result obtained by the means for deciding;

means for inserting, at the base station, the first transmission power control bits periodically into a forward (from base station to mobile station) frame;

means for calculating, at the mobile station, tentative reverse (mobile station to base station) transmission power in accordance with the first transmission power control bits in the forward frame sent from the base station;

means for deciding, at the mobile station, reverse transmission power, the reverse transmission power being made equal to the tentative reverse transmission power when the tentative reverse transmission power is equal to or less than first predetermined maximum transmission power, and being made equal to the first predetermined maximum transmission power when the tentative reverse transmission power is greater than the first predetermined maximum transmission power; and means for transmitting a signal from the mobile station to the base-station at the reverse transmission power.

Here, the first predetermined maximum transmission power may be determined on the basis of a maximum capacity in terms of number of subscribers in a cell, a radius of the cell, and an outage probability of the cell.

In a fourth aspect of the present invention, there is provided a transmission power control apparatus for a CDMA (Code Division Multiple Access) system comprising;

means for calculating, at a mobile station, an actual SIR (Signal-to-Interference Ratio), the actual SIR being defined as a ratio of received power of a desired signal sent from a base station with which the mobile station is communicating to a sum of interference power and thermal noise power from other stations;

means for deciding, at the mobile station, whether the actual SIR is greater than a predetermined reference SIR which satisfies a predetermined communication quality;

means for forming at the mobile station, one or more transmission power control bits on the basis of a result obtained by the means for deciding;

means for inserting, at the mobile station, the transmission power control bits periodically into a reverse (from mobile station to base station) frame;

means for calculating, at the base station, tentative forward (base station to mobile station) transmission power in accordance with the transmission power control bits in the reverse frame sent from the mobile station;

means for deciding, at the base station, forward transmission power, the forward transmission power being made equal to the tentative forward transmission power when the tentative forward transmission power is equal to or less than a predetermined maximum transmission power, and being made equal to the predetermined maximum transmission power when the tentative forward transmission power is greater than the predetermined maximum transmission power; and means for transmitting a signal from the base station to the mobile station at the forward transmission power.

Here, the predetermined maximum transmission power may be determined on the basis of a maximum capacity in terms of number of subscribers in a cell, a radius of the cell, and an outage probability of the cell.

The transmission power control apparatus may further comprise:

means for calculating, at the mobile station, a second actual SIR (Signal-to-Interference Ratio), the second actual SIR being defined as a ratio of received power of a desired signal sent from the base station with which the mobile station is communicating to a sum of interference power and thermal noise power from other stations;

means for deciding, at the mobile station, whether the second actual SIR is greater than a second predetermined reference SIR which satisfies a predetermined communication quality;

means for forming, at the mobile station, one or more second transmission power control bits on the basis of a result obtained by the means for deciding;

means for inserting, at the mobile station, the second transmission power control bits periodically into a reverse (from mobile station to base station) frame;

means for calculating, at the base station, tentative forward (base station to mobile station) transmission power in accordance with the second transmission power control bits in the reverse frame sent from the mobile station;

means for deciding, at the base station, forward transmission power, the forward transmission power being made equal to the tentative forward transmission power when the tentative forward transmission power is equal to or less than second predetermined maximum transmission power, and being made equal to the second predetermined maximum transmission power when the tentative forward transmission power is greater than the second predetermined maximum transmission power; and means for transmitting a signal from the base station to the mobile station at the forward transmission power.

According to the present invention, since an upper limit value of the maximum transmission power of a mobile station is set at such a value that the required quality is satisfied at the base station for the maximum number of subscribers of the system, a transmitter amplifier of the mobile station does not diverge during the transmission power control. A similar transmission power control which can follow the interference power from other cells can also be implemented for a forward channel.

The above and other objects, effects, features and advantages of the present invention will become more apparent from the following description of the embodiment thereof taken in conjunction with the accompanying drawings.

BRIEF DESCRIPTION OF THE DRAWINGS

FIG. 12 is a diagram showing the operation of a closed loop transmission power control in accordance with the present invention.

DETAILED DESCRIPTION OF PREFERRED EMBODIMENT

The invention will now be described with reference to the accompanying drawings.

Figure 1:
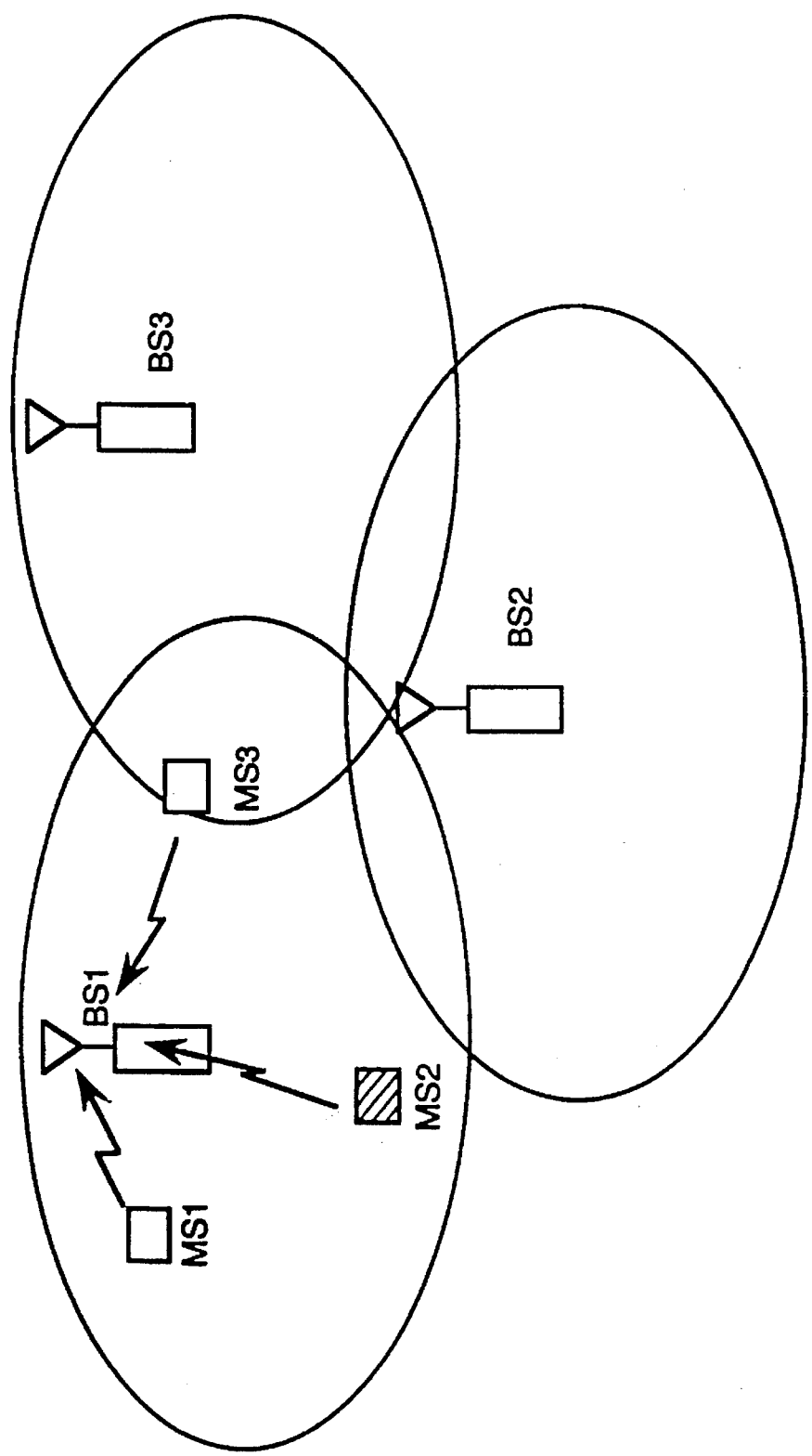
FIG. 1 is a diagram illustrating interferences from other mobile stations to a reverse channel.
Figure 2:
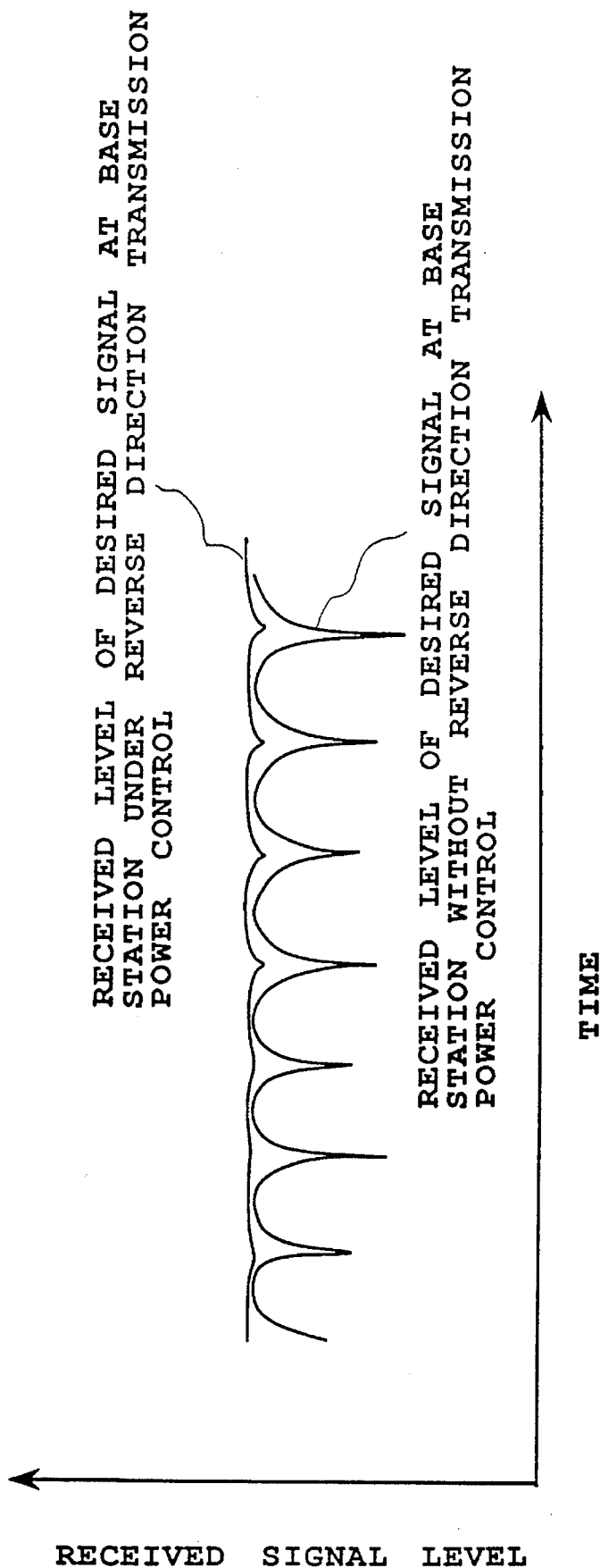
FIG. 2 is a diagram illustrating a received signal level at a base station when a reverse transmission power control is performed in comparison with that when the control is not carried out.
Figure 3:
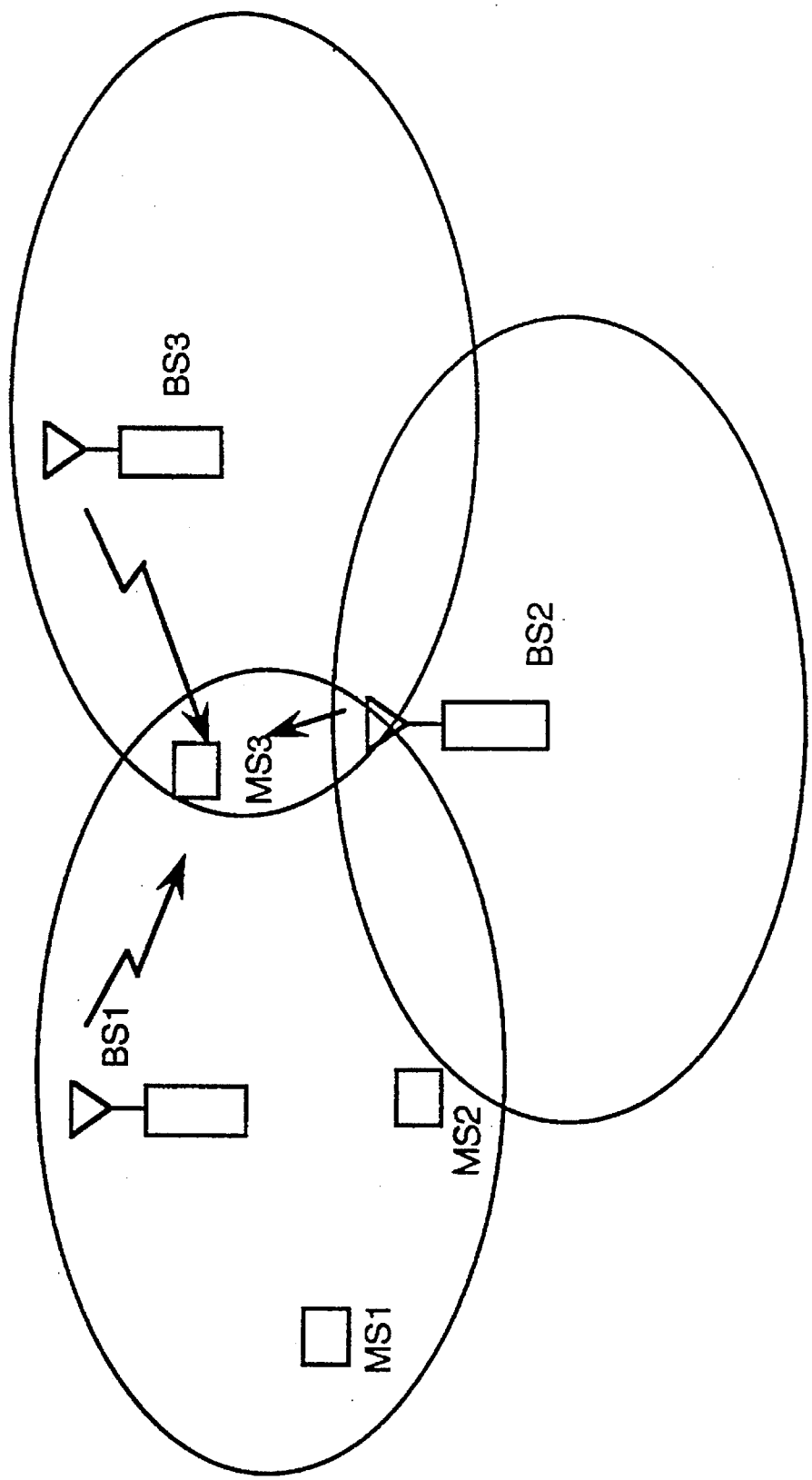
FIG. 3 is a diagram illustrating interferences from other cells to a forward channel.
Figure 4:
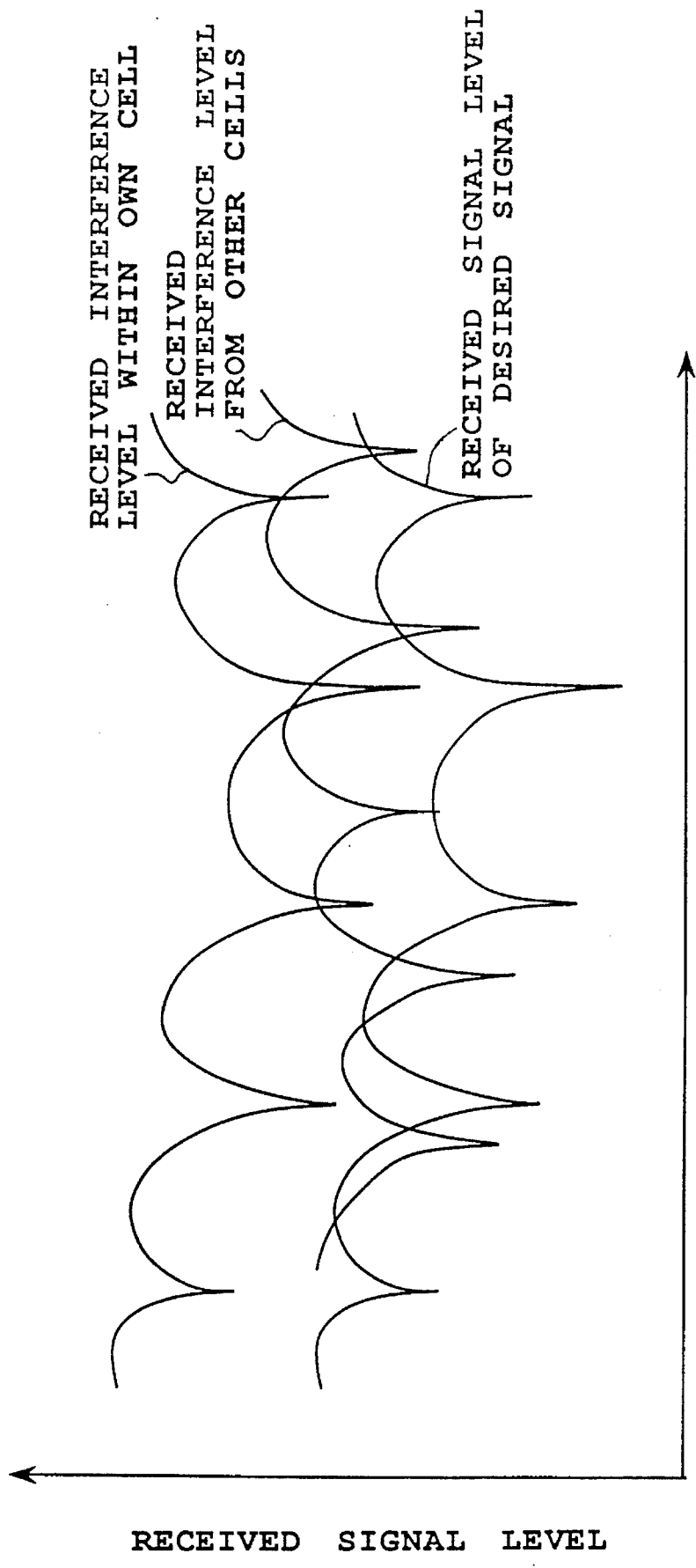
FIG. 4 is a diagram illustrating received signal and interference levels to a forward channel at a mobile station.
Figure 5:
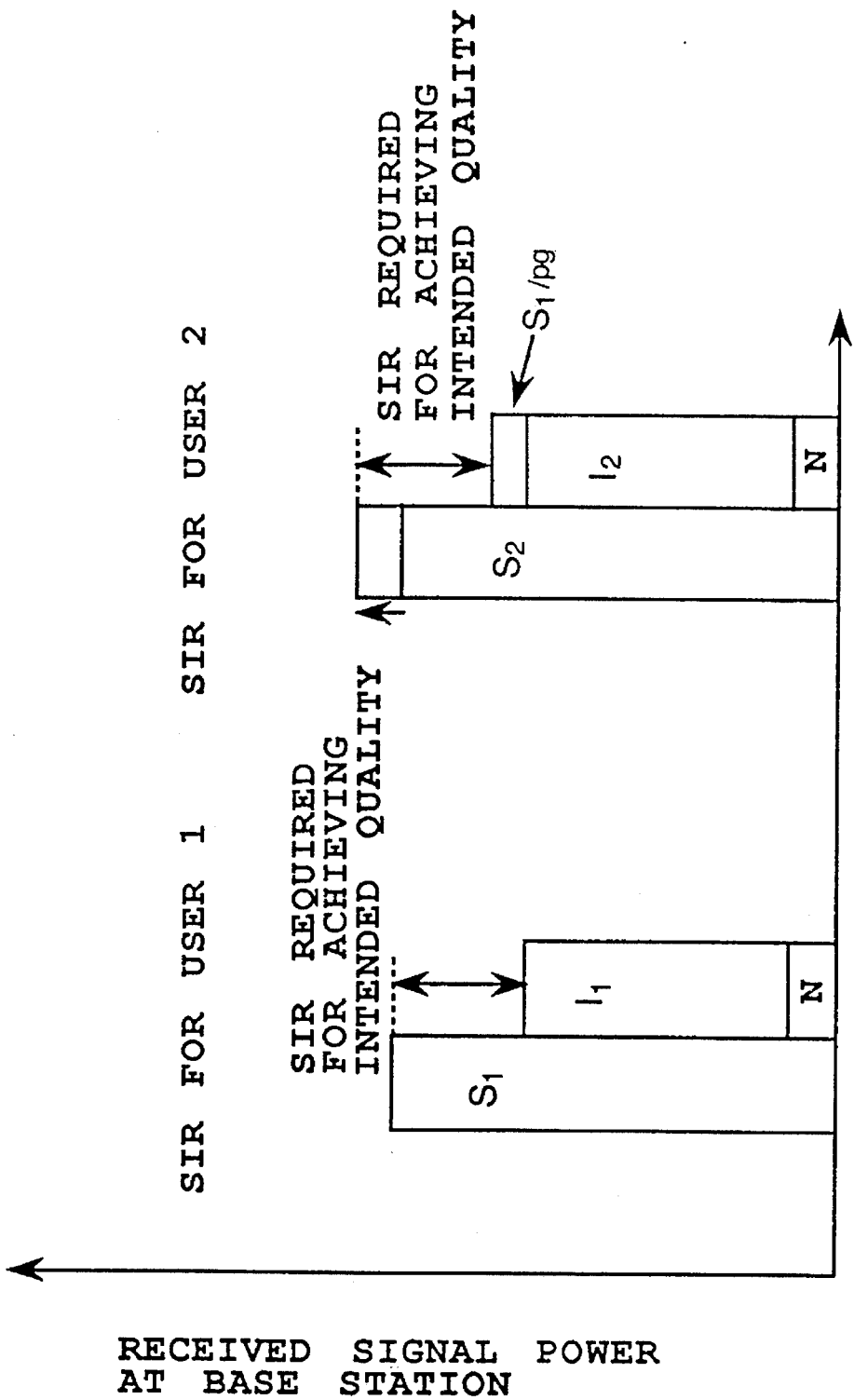
FIG. 5 is a diagram illustrating a first conventional transmission power control in terms of SIR.
Figure 6:
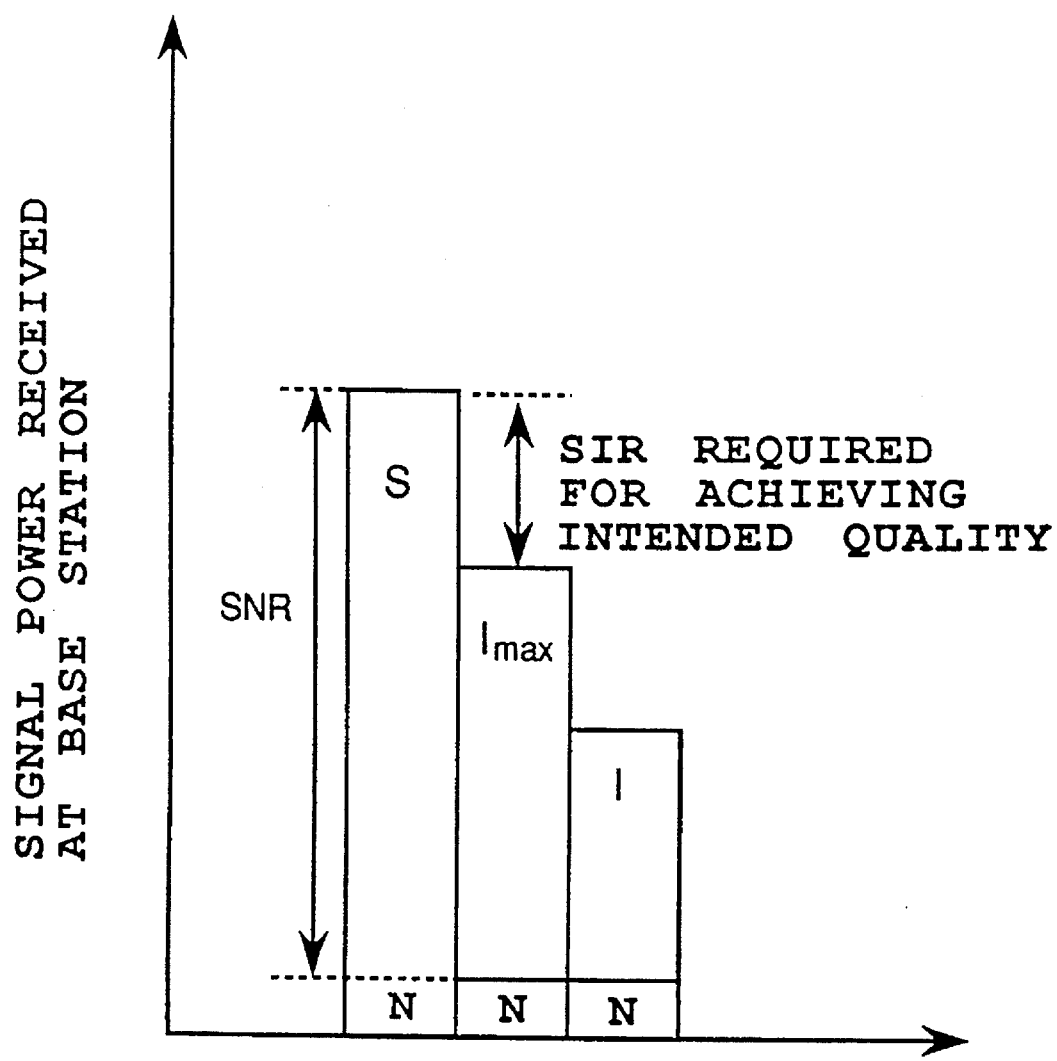
FIG. 6 is a diagram illustrating a second conventional transmission power control in terms of a thermal noise level.
Figure 7:
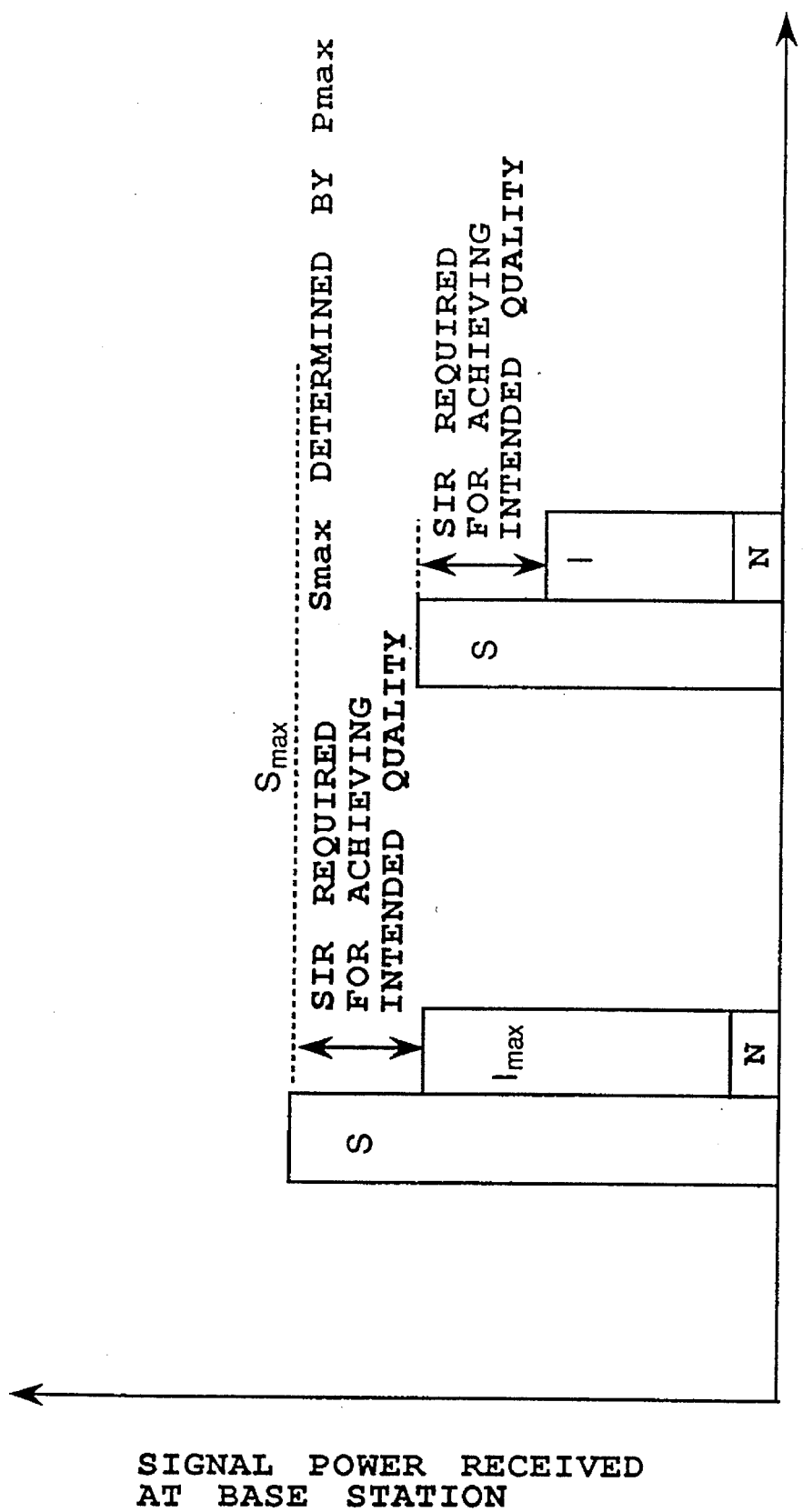
FIG. 7 is a diagram illustrating the principle of a transmission power control in accordance with the present invention.

FIG. 7 illustrates the operation principle of the transmission power control method in accordance with the present invention. Radio equipment of a base station controls the transmission power of a mobile station such that the ratio S/(N+I) of the received signal power S of a desired signal from an intended mobile station to the sum N+I of thermal noise N and interference power I from other mobile stations satisfies an intended reception quality at the base station. The period of the power control is set equal to or less than a period that can follow instantaneous fluctuations corresponding to the Doppler frequency. When the transmission power $P_T$ of a mobile station increases to the maximum transmission power $P_{max}$ because of increasing interference, the transmission power of the mobile station is fixed to $P_{max}$ which is determined by the maximum capacity in terms of the number of subscribers, the radius of the cell, and an outage probability. The outage probability represents a percentage of areas that cannot satisfy a required channel quality in a service area. Thus, the transmission power of the mobile station cannot exceed the maximum transmission power $P_{max}$ which corresponds to the maximum signal level $S_{max}$ at the base station. A closed loop transmission power control is also performed in a forward channel in border areas of the cell so that the transmission power can follow instantaneous fluctuations of interferences from other cells. The base station also performs the transmission power control of a forward channel in accordance with the received SIR at a mobile station as in a reverse channel so that the transmission power is fixed at a maximum transmission power $P'_{max}$, whereby preventing the transmission power of the base station from increasing beyond $P'_{max}$.

Figure 8:
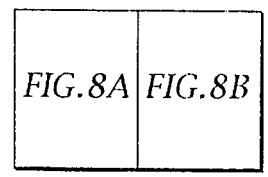
FIGS. 8A and 8B are block diagrams showing a portion of a mobile station, which is associated with the transmission power control in accordance with the present invention.
Figure 8A:
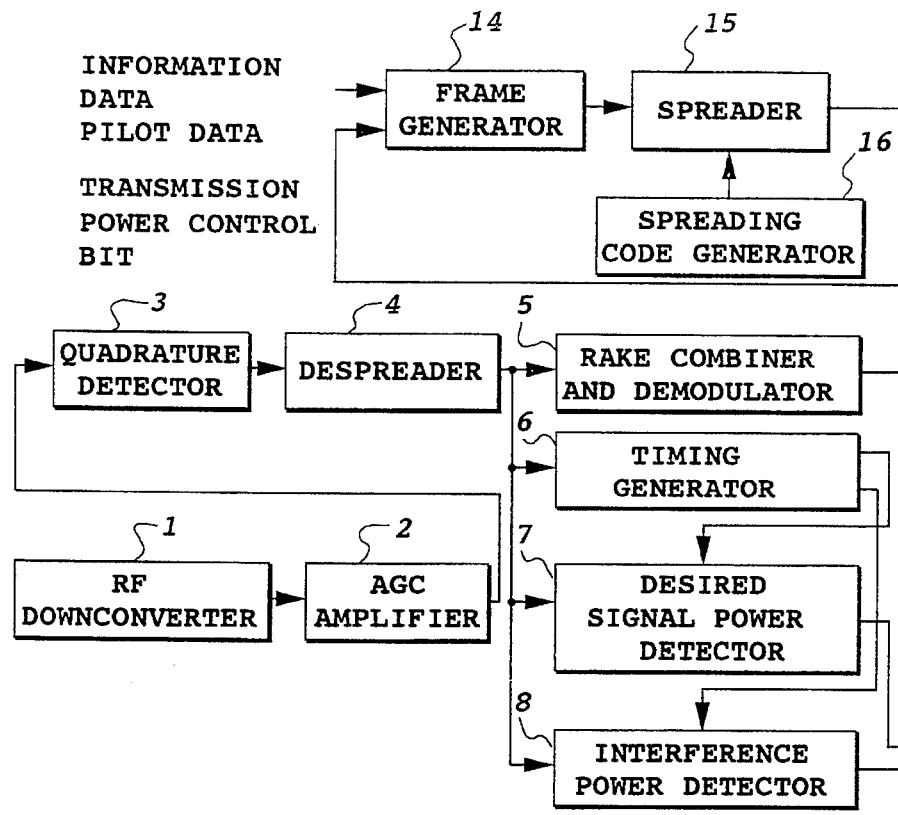
Figure 8B:
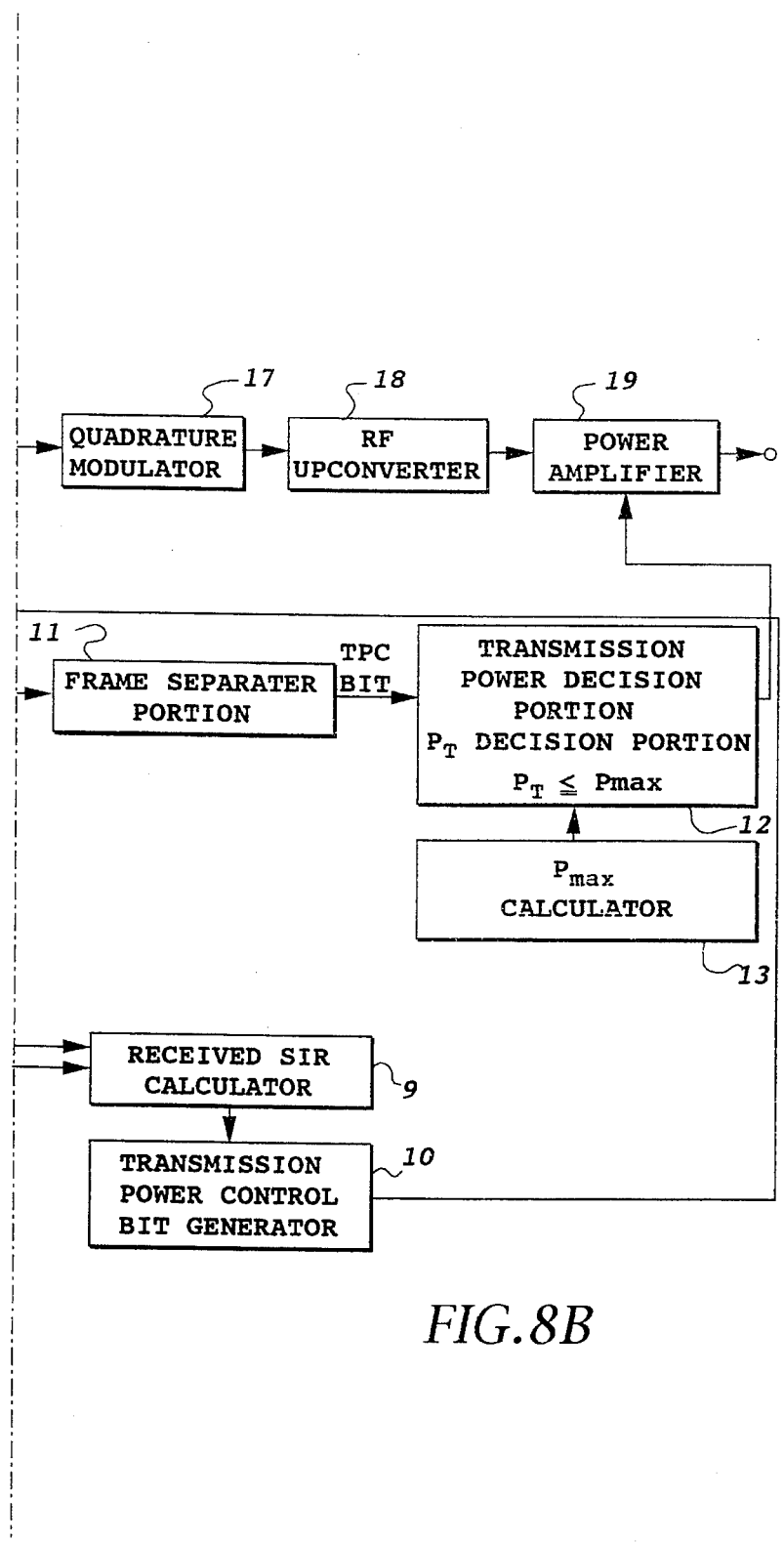

FIGS. 8A and 8B are block diagrams showing a portion associated with the transmission power control in a mobile station.

In FIGS. 8A and 8B, the reference numeral 1 designates an RF downconverter for converting an RF (Radio Frequency) received signal to an IF (Intermediate Frequency) signal. The output signal of the RF downconverter 1 is supplied to an AGC (Automatic Gain Control) amplifier 2 which forms a fixed level signal from the output signal. The output of the AGC amplifier 2 undergoes quadrature detection by a quadrature detector 3. The output of the quadrature detector 3 is despread by a despreading portion 4 composed of matched filters or a sliding correlator. The output of the despreading portion 4 is inputted to a RAKE combiner and demodulator 5, a timing generator 6, a desired received signal power detector 7 and an interference power detector 8.

The timing generator 6 detects a synchronizing signal from the input signal, and provides the desired received signal power detector 7 and the interference power detector 8 with a timing clock signal on the basis of the detected synchronizing signal. The desired received signal power detector 7 detects the desired received signal power from the input signal on the basis of the timing clock signal. The interference power detector 8 detects the interference power from the input signal on the basis of the timing clock signal. An SIR calculation portion 9 calculates a received SIR from these detected outputs, and supplies the resultant received SIR to a transmission power control bit generator 10. The generator 10 compares the received SIR with a predetermined reference SIR satisfying a predetermined reception quality, and determines a transmission power control bit to be sent to the base station.

The RAKE combiner and demodulator 5 demodulates a RAKE combined input signal, and provides it to a frame separating portion 11. The frame separating portion 11 extracts the transmission power control bit from a frame, and provides it to a transmission power decision portion 12. The transmission power decision portion 12 determines the transmission power $P_T$ in accordance with the transmission power control bit, compares the transmission power $P_T$ with the maximum power $P_{max}$ calculated by a maximum power calculation portion 13, and outputs a value corresponding to $P_T$ when $P_T$ is less than $P_{max}$, and a value corresponding to $P_{max}$ when $P_T$ is greater than $P_{max}$.

The maximum power calculation portion 13 calculates the maximum power $P_{max}$ as follows: First, the received power S at the base station is expressed by the following equation.

$$SNR = \frac{S}{\frac{N_0}{T_S} + (1+\alpha)\frac{(C-1)S}{pg}} \qquad (1)$$

where SNR is a noise-to-signal ratio of the desired received power to noise power including the interference power, for satisfying a predetermined quality (error rate), $N_0$ is a power density of thermal noise, $T_S$ is a symbol interval of information data, pg is a processing gain, C is the capacity in terms of the number of subscribers per cell, and $\alpha$ is a ratio of interference power from other cells to that of the cell of interest. The received power S at the base station can be obtained by the following equation derived from equation (1).

$$S = \frac{SNR \cdot N_0 \cdot pg}{T_S[pg - (1+\alpha)(C-1)SNR]} \qquad (2)$$

Considering a propagation loss $P_{LOSS}$, the maximum transmission power $P_{max}$ of the mobile station is expressed by $$P_{max} = \frac{SNR \cdot N_0 \cdot pg}{T_S[pg - (1+\alpha)(C-1)SNR]} + P_{LOSS} \qquad (3)$$

The maximum transmission power of the base station can be obtained in a similar manner.

The frame generator 14 forms a frame (reverse frame) including the transmission power control bit from the transmission power control bit generator 10, information data such as voice information, and pilot data for communication control, and provides the frame to a spreading portion 15. The spreading portion 15 spectrum-spreads the signal from the frame generator 14 using a spreading code supplied from a spreading code generator 16, and provides it to a quadrature modulator 17. The quadrature modulator 17 performs quadrature modulation on the signal from the spreading portion 15, and provides the modulated signal to an RF upconverter 18. The RF upconverter 18 converts the signal from the quadrature modulator 17 to an RF signal, and provides it to a power amplifier 19. The power amplifier 19 amplifies the signal from the RF upconverter 18 such that the transmission power of the signal becomes the transmission power determined by the transmission power decision portion 12. The output of the power amplifier 19 is fed to an antenna, and is radiated to the base station. The transmission power control period at the power amplifier 19 is determined at a value that enables the transmission power control to follow instantaneous fluctuations corresponding to the Doppler frequency.

Figure 9:
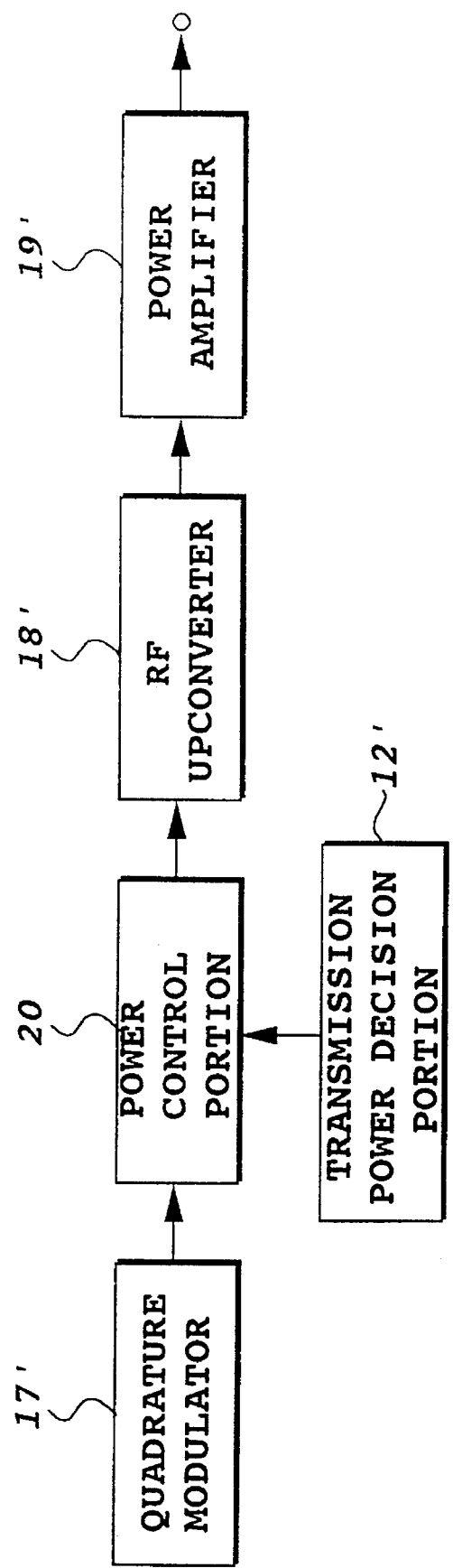
FIG. 9 is a block diagram showing a portion of a base station, which is associated with the transmission power control in accordance with the present invention.

The mobile station has an arrangement as described above. The base station has a similar arrangement except for a portion shown in FIG. 9. In FIG. 9, a power control portion 20 is connected to the input of an RF upconverter 18'. The power control portion 20 controls (bit shifts) the power of the signal (a baseband signal) outputted from a quadrature modulator 17' in response to the transmission power value supplied from a transmission power decision portion 12'. This facilitates combining a plurality of channels at the baseband and amplifying them all together, which is performed at the base station.

Figure 10:
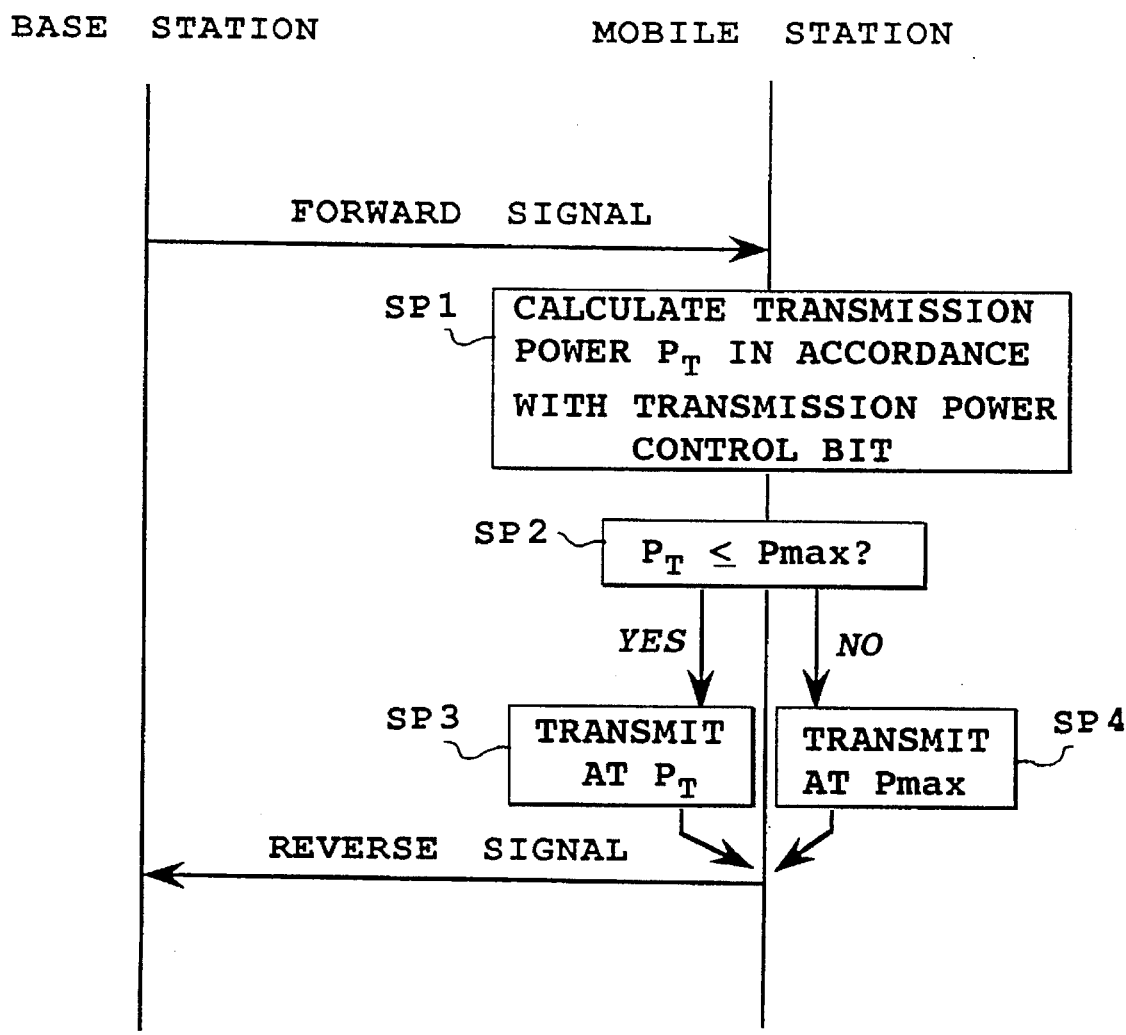
FIG. 10 is a flowchart showing a reverse transmission power control method in accordance with the present invention.

FIG. 10 is a flowchart showing the transmission power control of the mobile station. The transmission power $P_T$ is calculated on the basis of the transmission power bit sent from the base station at step SP1. Subsequently, the calculated power $P_T$ is compared with the maximum power $P_{max}$ at step SP2. If the calculated power $P_T$ is equal to or less than the maximum power $P_{max}$, the transmission power is set at $P_T$ at step SP3, whereas if the calculated power $P_T$ is greater than the maximum power $P_{max}$, the transmission power is set at $P_{max}$ at step SP4.

Figure 11:
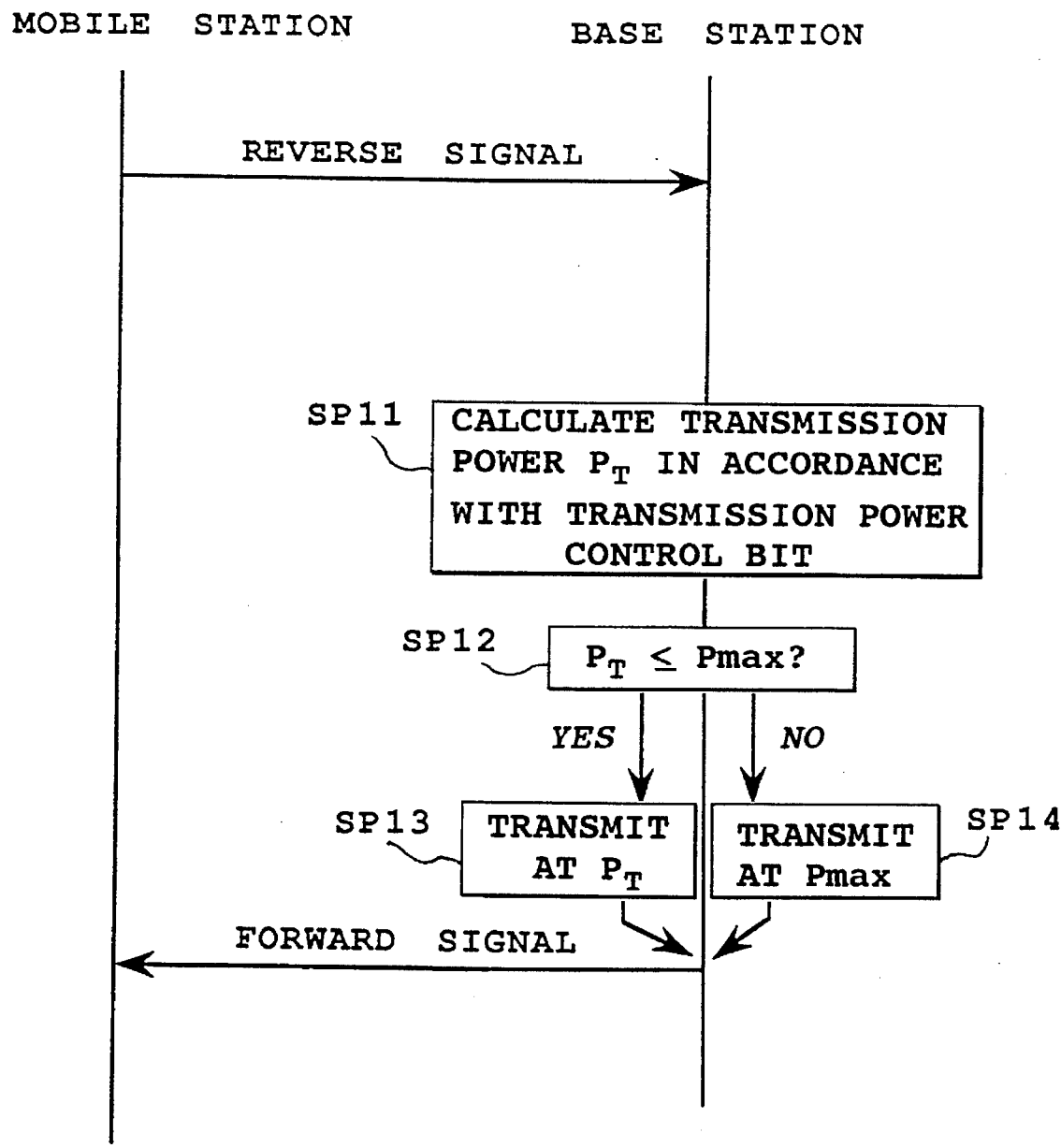
FIG. 11 is a flowchart showing a forward transmission power control method in accordance with the present invention.

FIG. 11 is a flowchart showing the transmission power control of the base station. The transmission power $P_T$ is calculated on the basis of the transmission power bit sent from the mobile station at step SP11. Subsequently, the calculated power $P_T$ is compared with the maximum power $P_{max}$ at step SP12. If the calculated power $P_T$ is equal to or less than the maximum power $P_{max}$, the transmission power is set at $P_T$ at step SP13, whereas if the calculated power $P_T$ is greater than the maximum power $P_{max}$, the transmission power is set at $P_{max}$ at step SP14.

FIG. 12 shows an example of a closed loop transmission power control method in accordance with the present invention. The transmission power control is carried out as follows (the number in brackets correspond to those of FIG. 12.):

[1] The base station measures a desired received power level, and calculates an SIR.

[2] The base station estimates the transmission power at two transmission power control periods later by comparing the measured SIR with a predetermined reference SIR.

[3] The base station generates a transmission power control bit which commands an increment or decrement of transmission power of a mobile station, and inserts it into a forward frame periodically. The insertion period is determined such that the power control can follow instantaneous fluctuations associated with the Doppler frequency.

[4] The mobile station decodes the reverse transmission power control bit included in the forward frame sent from the base station.

[5] The mobile station transmits a signal at the transmission power commanded by the reverse transmission power control bit included the forward frame.

In reverse communications, a dynamic range of 70 dB or more is necessary for the transmitter amplifier of a mobile station to achieve the communication in a cell whose radius is a few kilometers. In contrast with this, in forward communications, changed amounts of the transmission power of the base station must be limited to a small range of less than 10 dB from the steady state maximum power $P'_{max}$ because increasing the transmission power of the base station when a mobile station receives interference from other cells at an edge of the cell will cause interference to other communicators within the cell.

The present invention has been described in detail with respect to an embodiment, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A transmission power control method for a CDMA (Code Division Multiple Access) system comprising the steps of:

calculating, at a base station, a first actual SIR (Signal-to-Interference Ratio), said first actual SIR being defined as a ratio of received power of a desired signal sent from a mobile station with which the base station is communicating to a sum of interference power and thermal noise power from other stations;

deciding, at the base station, whether said first actual SIR is greater than a first predetermined reference SIR which satisfies a predetermined communication quality;

forming, at the base station, one or more first transmission power control bits on the basis of a result of said step of deciding;

inserting, at the base station, said first transmission power control bits periodically into a forward (from base station to mobile station) frame;

calculating, at said mobile station, tentative reverse (mobile station to base station) transmission power in accordance with said first transmission power control bits in said forward frame sent from said base station;

deciding, at the mobile station, reverse transmission power, said reverse transmission power being made equal to said tentative reverse transmission power when said tentative reverse transmission power is equal to or less than first predetermined maximum transmission power, and being made equal to said first predetermined maximum transmission power when said tentative reverse transmission power is greater than said first predetermined maximum transmission power; and transmitting a signal from said mobile station to said base station at said reverse transmission power.

2. The transmission power control method as claimed in claim 1, wherein said first predetermined maximum transmission power is determined on the basis of a maximum capacity in terms of number of subscribers in a cell, a radius of the cell, and an outage probability of the cell.

3. The transmission power control method as claimed in claim 1, further comprising the steps of:

calculating, at the mobile station, a second actual SIR (Signal-to-Interference Ratio), said second actual SIR being defined as a ratio of received power of a desired signal sent from the base station with which the mobile station is communicating to a sum of interference power and thermal noise power from other stations;

deciding, at the mobile station, whether said second actual SIR is greater than a second predetermined reference SIR which satisfies a predetermined communication quality;

forming, at the mobile station, one or more second transmission power control bits on the basis of a result of said step of deciding;

inserting, at the mobile station, said second transmission power control bits periodically into a reverse (from mobile station to base station) frame;

calculating, at said base station, tentative forward (base station to mobile station) transmission power in accordance with said second transmission power control bits in said reverse frame sent from said mobile station;

deciding, at the base station, forward transmission power, said forward transmission power being made equal to said tentative forward transmission power when said tentative forward transmission power is equal to or less than second predetermined maximum transmission power, and being made equal to said second predetermined maximum transmission power when said tentative forward transmission power is greater than said second predetermined maximum transmission power; and transmitting a signal from said base station to said mobile station at said forward transmission power.

4. A transmission power control method for a CDMA (Code Division Multiple Access) system comprising the steps of:

calculating, at a mobile station, an actual SIR (Signal-to-Interference Ratio), said actual SIR being defined as a ratio of received power of a desired signal sent from a base station with which the mobile station is communicating to a sum of interference power and thermal noise power from other stations;

deciding, at the mobile station, whether said actual SIR is greater than a predetermined reference SIR which satisfies a predetermined communication quality;

forming, at the mobile station, one or more transmission power control bits on the basis of a result of said step of deciding;

inserting, at the mobile station, said transmission power control bits periodically into a reverse (from mobile station to base station) frame;

calculating, at said base station, tentative forward (base station to mobile station) transmission power in accordance with said transmission power control bits in said reverse frame sent from said mobile station;

deciding, at the base station, forward transmission power, said forward transmission power being made equal to said tentative forward transmission power when said tentative forward transmission power is equal to or less than a predetermined maximum transmission power, and being made equal to said predetermined maximum transmission power when said tentative forward transmission power is greater than said predetermined maximum transmission power; and transmitting a signal from said base station to said mobile station at said forward transmission power.

5. The transmission power control method as claimed in claim 4, wherein said predetermined maximum transmission power is determined on the basis of a maximum capacity in terms of number of subscribers in a cell, a radius of the cell, and an outage probability of the cell.

6. A transmission power control apparatus for a CDMA (Code Division Multiple Access) system comprising:

means for calculating, at a base station, a first actual SIR (Signal-to-Interference Ratio), said first actual SIR being defined as a ratio of received power of a desired signal sent from a mobile station with which the base station is communicating to a sum of interference power and thermal noise power from other stations;

means for deciding, at the base station, whether said first actual SIR is greater than a first predetermined reference SIR which satisfies a predetermined communication quality;

means for forming, at the base station, one or more first transmission power control bits on the basis of a result obtained by said means for deciding;

means for inserting, at the base station, said first transmission power control bits periodically into a forward (from base station to mobile station) frame;

means for calculating, at said mobile station, tentative reverse (mobile station to base station) transmission power in accordance with said first transmission power control bits in said forward frame sent from said base station;

means for deciding, at the mobile station, reverse transmission power, said reverse transmission power being made equal to said tentative reverse transmission power when said tentative reverse transmission power is equal to or less than first predetermined maximum transmission power, and being made equal to said first predetermined maximum transmission power when said tentative reverse transmission power is greater than said first predetermined maximum transmission power; and means for transmitting a signal from said mobile station to said base station at said reverse transmission power.

7. The transmission power control apparatus as claimed in claim 6, wherein said first predetermined maximum transmission power is determined on the basis of a maximum capacity in terms of number of subscribers in a cell, a radius of the cell, and an outage probability of the cell.

8. The transmission power control apparatus as claimed in claim 6, further comprising:

means for calculating, at the mobile station, a second actual SIR (Signal-to-Interference Ratio), said second actual SIR being defined as a ratio of received power of a desired signal sent from the base station with which the mobile station is communicating to a sum of interference power and thermal noise power from other stations;

means for deciding, at the mobile station, whether said second actual SIR is greater than a second predetermined reference SIR which satisfies a predetermined communication quality;

means for forming, at the mobile station, one or more second transmission power control bits on the basis of a result obtained by said means for deciding;

means for inserting, at the mobile station, said second transmission power control bits periodically into a reverse (from mobile station to base station) frame;

means for calculating, at said base station, tentative forward (base station to mobile station) transmission power in accordance with said second transmission power control bits in said reverse frame sent from said mobile station;

means for deciding, at the base station, forward transmission power, said forward transmission power being made equal to said tentative forward transmission power when said tentative forward transmission power is equal to or less than second predetermined maximum transmission power, and being made equal to said second predetermined maximum transmission power when said tentative forward transmission power is greater than said second predetermined maximum transmission power; and means for transmitting a signal from said base station to said mobile station at said forward transmission power.

9. A transmission power control apparatus for a CDMA (Code Division Multiple Access) system comprising;

means for calculating, at a mobile station, an actual SIR (Signal-to-Interference Ratio), said actual SIR being defined as a ratio of received power of a desired signal sent from a base station with which the mobile station is communicating to a sum of interference power and thermal noise power from other stations;

means for deciding, at the mobile station, whether said actual SIR is greater than a predetermined reference SIR which satisfies a predetermined communication quality;

means for forming, at the mobile station, one or more transmission power control bits on the basis of a result obtained by said means for deciding;

means for inserting, at the mobile station, said transmission power control bits periodically into a reverse (from mobile station to base station) frame;

means for calculating, at said base station, tentative forward (base station to mobile station) transmission power in accordance with said transmission power control bits in said reverse frame sent from said mobile station;

means for deciding, at the base station, forward transmission power, said forward transmission power being made equal to said tentative forward transmission power when said tentative forward transmission power is equal to or less than a predetermined maximum transmission power, and being made equal to said predetermined maximum transmission power when said tentative forward transmission power is greater than said predetermined maximum transmission power; and means for transmitting a signal from said base station to said mobile station at said forward transmission power.

10. The transmission power control apparatus as claimed in claim 9, wherein said predetermined maximum transmission power is determined on the basis of a maximum capacity in terms of number of subscribers in a cell, a radius of the cell, and an outage probability of the cell.

* * * * *

UNITED STATES PATENT AND TRADEMARK OFFICE
CERTIFICATE OF CORRECTION

PATENT NO. : 5,566,165
APPLICATION NO. : 08/439302
DATED : October 15, 1996
INVENTOR(S) : Mamoru Sawahashi et al.

Page 1 of 3

It is certified that error appears in the above-identified patent and that said Letters Patent is hereby corrected as shown below:

For each occurrence (as indicated below citing the particular column and line numbers), the phrase:
"a sum of interference power and thermal noise power from other stations;"
should be replaced with:
-- a sum of interference power from other stations and thermal noise power; --

Column 3, lines 55–56:
the phrase:
"a sum of interference power and thermal noise power from other stations;"
should be replaced with:
-- a sum of interference power from other stations and thermal noise power; --

Column 4, lines 28–30:
the phrase:
"a sum of interference power and thermal noise power from other stations;"
should be replaced with:
-- a sum of interference power from other stations and thermal noise power; --

Column 4, lines 66–67:
the phrase:
"a sum of interference power and thermal noise power from other stations;"
should be replaced with:
-- a sum of interference power from other stations and thermal noise power; --

Column 5, lines 35–36:
the phrase:
"a sum of interference power and thermal noise power from other stations;"
should be replaced with:
-- a sum of interference power from other stations and thermal noise power; --

Signed and Sealed this
Eighteenth Day of October, 2011

David J. Kappos
*Director of the United States Patent and Trademark Office*

CERTIFICATE OF CORRECTION (continued)
U.S. Pat. No. 5,566,165

Column 6, lines 9–10:
the phrase:
    "a sum of interference power and thermal noise power from other stations;"
should be replaced with:
    -- a sum of interference power from other stations and thermal noise power; --

Column 6, lines 47–49:
the phrase:
    "a sum of interference power and thermal noise power from other stations;"
should be replaced with:
    -- a sum of interference power from other stations and thermal noise power; --

Column 11, lines 9–10 (i.e., claim 1):
the phrase:
    "a sum of interference power and thermal noise power from other stations;"
should be replaced with:
    -- a sum of interference power from other stations and thermal noise power; --

Column 11, lines 48–49 (i.e., claim 3):
the phrase:
    "a sum of interference power and thermal noise power from other stations;"
should be replaced with:
    -- a sum of interference power from other stations and thermal noise power; --

Column 12, lines 17–18 (i.e., claim 4):
the phrase:
    "a sum of interference power and thermal noise power from other stations;"
should be replaced with:
    -- a sum of interference power from other stations and thermal noise power; --

Column 12, lines 55–56 (i.e., claim 6):
the phrase:
    "a sum of interference power and thermal noise power from other stations;"
should be replaced with:
    -- a sum of interference power from other stations and thermal noise power; --

Column 13, lines 28–30 (i.e., claim 8):
the phrase:
    "a sum of interference power and thermal noise power from other stations;"
should be replaced with:
    -- a sum of interference power from other stations and thermal noise power; --

Column 14, lines 15–16 (i.e., claim 9):

the phrase:

"a sum of interference power and thermal noise power from other stations;"

should be replaced with:

-- a sum of interference power from other stations and thermal noise power; --